United States Patent [19]

Tanabe et al.

[11] 4,228,943
[45] Oct. 21, 1980

[54] DEVICE FOR SEPARATING SUSPENDED MATERIAL FROM A FLUID STREAM BY SPECIFIC GRAVITY DIFFERENCE

[75] Inventors: Kaichi Tanabe, Tondabayashi; Shigeto Koga; Yoshinori Maeda, both of Kobe, all of Japan

[73] Assignee: Shinko-Pfaudler Company, Ltd., Kobe, Japan

[21] Appl. No.: 921,900

[22] Filed: Jul. 5, 1978

Related U.S. Application Data

[62] Division of Ser. No. 830,697, Sep. 6, 1977, Pat. No. 4,122,017.

[30] Foreign Application Priority Data

Dec. 28, 1976 [JP] Japan .................. 51/160692

[51] Int. Cl.³ .................. B23K 1/16; B01B 23/06
[52] U.S. Cl. .................. 228/182; 29/157.3 D; 156/157; 156/205; 156/210; 156/292; 428/184
[58] Field of Search .................. 228/178, 182, 181; 29/157.3 D; 428/594, 184; 156/205, 292, 157, 210

[56] References Cited

U.S. PATENT DOCUMENTS

| | | | |
|---|---|---|---|
| 3,340,023 | 9/1967 | Hulsey | 428/594 |
| 3,399,135 | 8/1968 | Conley et al. | 210/83 X |
| 3,669,820 | 6/1972 | Fredericks | 428/184 X |
| 3,768,648 | 10/1973 | Anderson et al. | 210/522 X |
| 3,909,901 | 10/1975 | Clark | 29/157.3 D |
| 3,991,245 | 11/1976 | Jackson | 156/205 X |

FOREIGN PATENT DOCUMENTS 1084809  7/1954  France .................. 428/594

Primary Examiner—Francis S. Husar
Assistant Examiner—Kenneth J. Ramsey
Attorney, Agent, or Firm—Kurt Kelman

[57] ABSTRACT

A tube settler improves separation performance by dividing flow path of a fluid to be treated into a multiplicity of tubular passages to achieve fluid stream commutation and to reduce the distance which a suspended particle has to fall increasing a settling area. A critical upward-flow rate for avoiding obstructions to precipitation of the suspended particle without turbulence depends on the cross-sectional configuration of the tubular passage. A tubular passage of triangular, circular, hexagonal or rhombic configuration is disadvantageous because the height or distance from top to bottom differs from part to part across the vertical section of the passage.

This invention provides a tube settler or multitube separator having a tube-nest assembly for passing the fluid to be treated therethrough. And, inclined tubular passages of the tube settler are an approximate boomerang cross-section.

2 Claims, 12 Drawing Figures

DEVICE FOR SEPARATING SUSPENDED MATERIAL FROM A FLUID STREAM BY SPECIFIC GRAVITY DIFFERENCE

This is a division of application Ser. No. 830,697, filed Sept. 6, 1977 now U.S. Pat. No. 4,122,017 issued Oct. 24, 1978.

BACKGROUND OF THE INVENTION

The present invention relates to an apparatus to be employed in the treatment of fluids, particularly water, sewage, waste water and the like, for separating suspended particles of foreign matter from the fluid being treated which contains such suspended particles by taking advantage of the difference between the specific gravity of such suspended particles and that of the fluid. More specifically, the invention relates to a multitube separator wherein an assembly comprising a multiplicity of long and narrow tubular passages of a certain cross-sectional configuration arranged compactly and parallel to one another under a certain systematic cross-sectional alignment is positioned in an inclined relation to the horizontal, through which tube-nest assembly the fluid being treated is allowed to pass, whereby the occurrence of a turbulence is prevented which hinders the settling of suspended particles from the flow of the fluid being treated and whereby the distance which a suspended particle in the fluid must fall until it reaches the bottom of the passage. The purpose of the tube-nest assembly is to obtain improved results such as reduced time for separation, increased clarity of the separated fluid, and increased treatment capacity, and also to provide a more compact apparatus. The invention provides a multitube separator of novel and improved design which further improves said improved results and also gives various other advantages.

This type of multitube separator can be employed for the settling and separation of suspended particles having a greater specific gravity than the fluid to be treated or for the floating and separation of particles having a smaller specific gravity than the fluid, whichever the case may be. Suspended materials are often in the form of fine solid particles. Beside the case with such suspended materials, the separator can be also employed for separating immiscible fluids, e.g., oil from water. However, for the purpose of simplification and better understanding, description is made hereinafter mainly with respect to the case where fine solid suspended particles having a greater specific gravity than the fluid being treated are settled and separated from the fluid.

A settling and separating device having above said type of multitube separator is hereinafter referred to as a tube settler.

DESCRIPTION OF THE PREFERRED EMBODIMENTS

Figure 1:
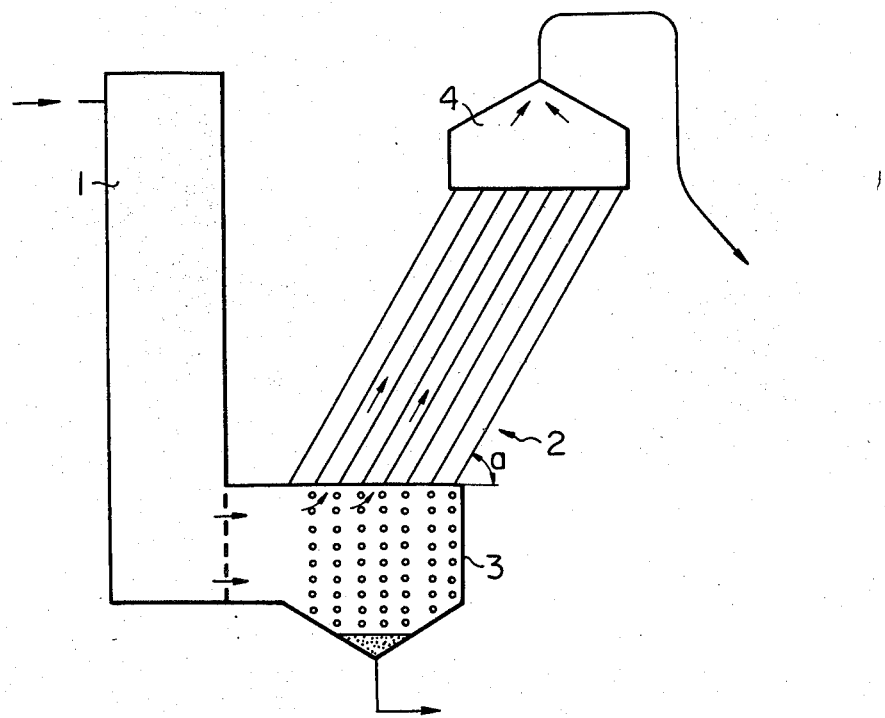
FIG. 1 is a schematic illustration of a typical suspended-material separating apparatus employing a tube settler including the device according to this invention.

FIG. 1 shows a typical example of the tube settler. However, it is to be expressly understood that the scope of the invention is not limited to such example. Referring to FIG. 1, raw water containing suspended particles is mixed with a chemical coagulant such as aluminum polychloride or alumina sulfate, stirred, and the mixture is introduced into a flocculator tank 1 wherein coagulant flocs adhere to suspended particles to form large precipitatable particles of greater specific gravity. The water thus flocculated is led to the influent end of a tube settler assembly shown generally as 2. The tube settler assembly comprises a multiplicity of long and narrow tubular passages having a selected cross-sectional configuration aligned parallel under a certain systematic cross-sectional arrangement and inclined at an angle a to the horizontal. Said water flows slantingly and upwardly through the tubular passages in the tube settler and meanwhile the flocs adhering to suspended particles are settled. Said angle a is greater than the angle of repose of the precipitate, so that the precipitate is allowed to flow down over the bottom of the tube counter to the flow of fluid. Discharge at the influent end of the tube settler, the precipitate is accumulated in the lower portion of a sludge collection tank 3 for periodic or continuous removal therefrom. The clarified fluid effluent from the top end of the tube settler is collected in a vessel (4) and is led away therefrom.

As described above, generally a tube settler provides improved separation performance through the division of the flow path of the raw water into a multiplicity of tubular passages, because such division improves fluid stream commutation, reduces the distance which a suspended particle must fall, and increases the settling area. Conventionally, the cross sectional configuration of the tubular passages of a tube settler has been such as circular, square, triangular, hexagonal, or rhombic. These shapes give no much satisfactory results for several reasons. A tubular passage of triangular, circular, hexagonal or rhombic shape has a disadvantage in that its height or distance from top to bottom differs from part to part across the vertical section of the passage. Accordingly, the distance which a suspended particle in the fluid must fall until it reaches the passage bottom varies depending upon where it is located. This leads to uneven precipitation and thus hinders effective utilization of the settling area within the tube. In a tubular passage of square cross section or triangular cross section wherein one side surface forms the bottom, the precipitate lies in a thin layer and has a relatively high surface area exposed to the fluid passing through the tube. This means relatively low gravitational forces effected on the precipitate for slip-off and relatively large frictional resistance, and it is likely that some of the precipitate is resuspended by a fluid stream running opposite to the direction of slip-off. Circular or hexagonal shape does not give sufficient concentration of precipitated matter either. A passage of chevron cross-sectional configuration disclosed in the Japanese Patent Public Disclosure No. 46-7436 provides uniform height, or uniform distance for precipitation across the vertical section thereof irrespective of where suspended particles are located; the precipitate is allowed to collect in a thick layer in the center of a V-shaped bottom of the passage.

In order to obtain effective settling and separation of suspended particles from fluids, turbulence must be avoided. The settling of suspended particles is substantially hampered under the condition of turbulence. The commonly used tube shapes other than said chevron cross-sectional configuration have a relatively high hydraulic radius, and the resulting Reynolds number for flow of a fluid through the tube passages is relatively high. Thus, with the commonly used tube shapes, it is necessary that the flow rate or through-put rate of fluid must be low in order to keep Reynolds number below the critical Reynolds number and to avoid turbulent flow. Accordingly, the critical upward-flow rate for avoiding obstructions to precipitation without turbulence is governed by the cross-sectional configuration of the tube passage; and with tube passages of the commonly used shapes, except said chevron cross-sectional configuration, the critical upward-flow rate is generally low. The hydraulic radius of said chevron cross-sectional configuration is low and the critical rate of upward flow through the passages of said configuration is high; so, chevron cross-sectional configuration increases the treating capacity of the tube settler.

It is an object of this invention to provide an improved cross-sectional configuration for the tubular passages of a tube settler, with overall advantages over the cross-sectional configurations disclosed in the prior art. The above said chevron cross-sectional configuration has been believed to prove more advantageous as a tube shape than any other cross-sectional configuration from a geometrical point of view, and in fact, exhibits good performance as such. In industrial application, however, it has been found that said configuration still involves a problem requiring reconsideration in relation to the effect of a boundary layer in the flow rate profile in the cross section of a tube passage. The flow rate of a boundary layer which develops along the passage wall as fluids flow ranges from free to zero. The boundary layer decreases the average flow rate of fluids passing through the tube. From a different point of view, it makes the effective sectional area of the tube smaller than the geometric sectional area thereof. If the cross section of a tube passage presents a zone surrounded by two contour portions intersecting at an acute angle, the boundary layer along the contour portions is apt to grow thicker, resulting in decreased average flow rate. It is a motive for this invention to eliminate the acute angle zone present in a chevron cross-sectional configuration under the limitation of certain systematic tube-passage alignment and without prejudice to the uniformity of settling distance and good sludge-collecting function. Other objects of this invention will become apparent fully from the following detailed description, and they include the provision of various other improvements.

The cross-sectional configuration of the tubular passages of a tube settler according to this invention and the configuration of a tube-nest assembly composed of the passages are described below.

Figure 2:
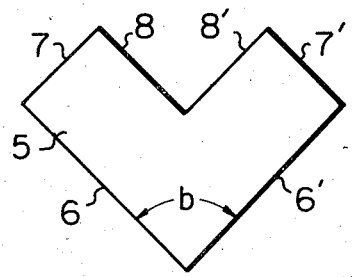
FIG. 2 illustrates the configuration of a tube passage in the tubular passage assembly according to this invention.

The tubular passages 5 of the tube settler according to the present invention are of an approximate boomerang cross-sectional configuration. As illustrated in FIG. 2, the cross-sectional configuration of a tubular passage 5 comprises two long sides 6 and 6' of equal length butted end-to-end so as to define a certain included angle b upwardly, said long sides forming a bottom wall, two inclined sides 7 and 7' of equal length, each extending from the other end of one of the long sides 6 and 6' in parallel relation to the other of the long sides 6' and 6 and in a direction in which an extension of each said inclined side intersects an extension of the other inclined side, said inclined sides forming side walls, two short sides 8 and 8' of equal length, each extending downwardly on an inclined plane from the other end of the inclined sides 7 and 7' in parallel relation to one of the long sides 6 and 6' and butted end-to-end, said short sides forming a top wall. These sides 6, 6', 7, 7', 8 and 8' define the boomerang cross-sectional configuration of the tubular passage. The included angle b is preferably 90° or may be one not very remote therefrom, i.e. 60°-120°, whereby it is possible to avoid any acute angle being present in the cross-sectional configuration.

Figure 3:
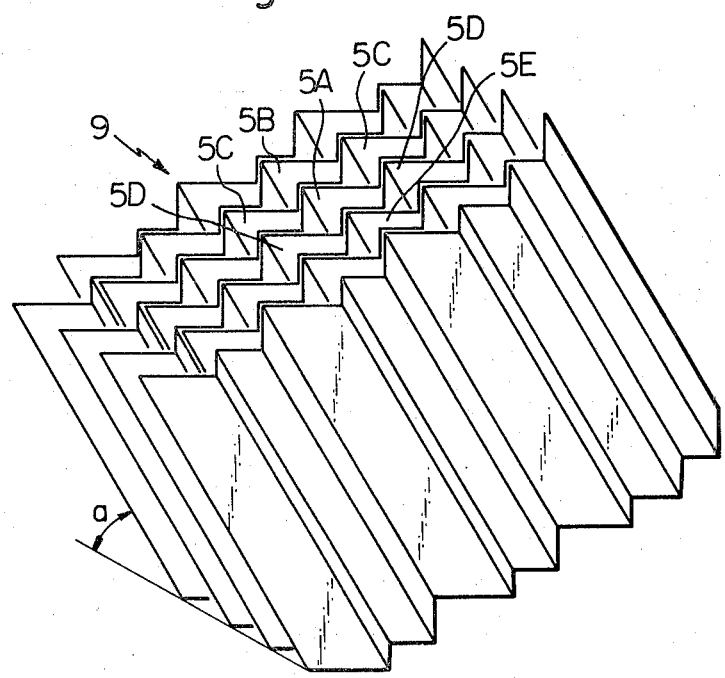
FIG. 3 is a bird's eye view of the tubular passage assembly according to this invention.
Figure 4:
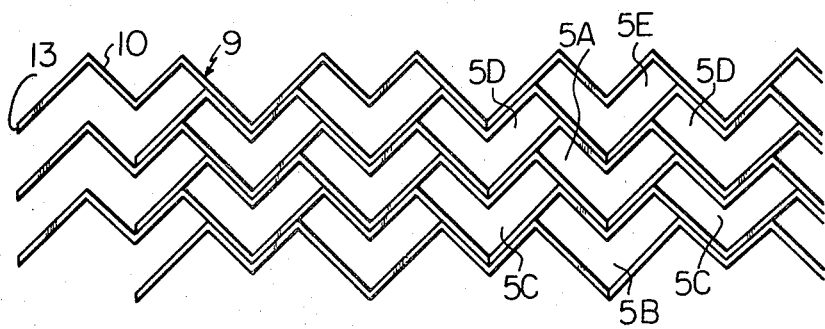
FIG. 4 is an end view of the flow passage ends in the tubular passage assembly according to this invention.

A multiplicity of long and narrow tubular passages 5 having this particular cross-sectional configuration are arranged compactly and in parallel to one another under a systematic alignment to form a tube-nest passage assembly 9. As can be seen in FIGS. 3 and 4, with respect to one particular passage 5A, the center portion of the bottom of the cross section thereof corresponds with the top side of a passage 5B located right thereunder, and the side portions of the bottom of said passage 5A correspond with inclined sides of the cross sections of adjacent lower passages 5C, 5C. The inclined sides of the cross section of said passage 5A correspond with side portions of the bottoms of adjacent upper passages 5D, 5D. Again, the top side of the cross section of said passage 5A corresponds with center portion of the bottom of the immediate upper passage 5E. Unit assemblies 9 connnected to a suitable size, are disposed at an angle a to the horizontal. In FIG. 1, said assemblies, as a tube settler assembly, are generally shown as 2.

The settling performance of a tube settler is greatly improved when the tube passages of the settler are of approximate boomerang cross-sectional configuration. The boomerang cross-sectional configuration has advantages over the commonly used passage shapes: it has a low hydraulic radius and accordingly the Reynolds number for flow through the tubular passages of this invention is low. The boomerang cross-sectional configuration prevents turbulence and permits laminar flow through the passages even where flow rates are much higher.

Figure 5:
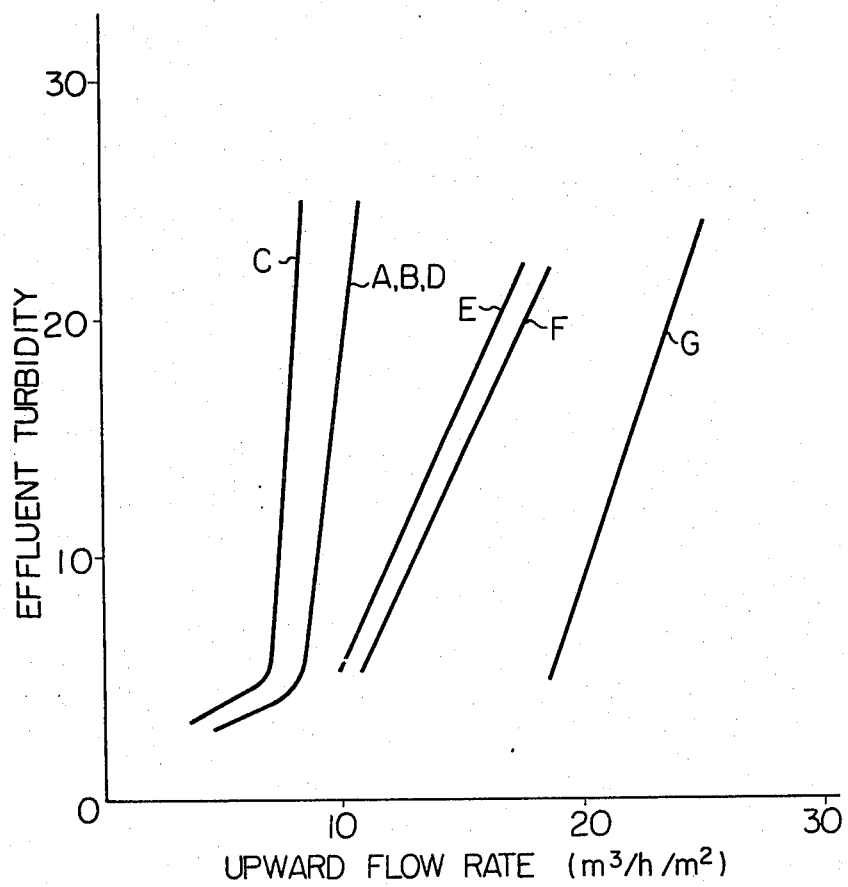
FIG. 5 is a graphic chart of test results showing the relation of effluent turbidity and upward flow rate for various tubular passages having various different cross-sectional configurations.

FIG. 5 gives a comparison of tube settlers of various passage shapes in settling performance, with upward flow rates on abscissae axis and effluent turbidity on ordinate axis. The geometric and hydraulic values of the tube passages tested are shown in Table 1, all passages having a sectional area of 36.5 cm².

TABLE 1

| Test No. | Shape | Sectional dimension (cm) | | Passage length (cm) | Hydraulic diameter (cm) | Max. section height (cm) |
|---|---|---|---|---|---|---|
| A | Circular | Dia. | 6.82 | 61 | 6.82 | 6.82 |
| B | Hexagonal | Each side | 3.75 | 61 | 6.48 | 7.5 |
| C | Square | Each side | 6.04 | 61 | 6.05 | 6.04 |
| D | Rhombus | Each side | 6.04 | 61 | 6.05 | 8.54 |
| E | Chevron | Each side | 5.08 | 61 | 4.79 | 5.08 |
| F | Similar to shape of this invention Boomerang | Short side | 3.29 | 61 | 5.31 | 5.08 |
|   |   | Oblique side | 3.59 |   |   |   |
|   |   | Base | 6.88 |   |   |   |
| G | Boomerang | Oblique side | 3.59 | 122 | 5.31 | 5.08 |
|   |   | Base | 6.88 |   |   |   |

It can be easily seen from FIG. 2 that in the cross section of the approximate boomerang configuration of this invention, the length of a long side 6 is equal to the sum of the length of an inclined side 7 and the length of a short side 8, and by reducing the proportion of inclined side 7 it is possible to reduce the sectional area and accordingly to reduce the hydraulic diameter. For the purpose of testing, however, the maximum cross-sectional height for the approximate boomerang configuration, which corresponds to the maximum distance a suspended particle must fall, was set at 5.08 cm, just equal to that of the chevron cross-sectional configuration, with the result that the hydraulic diameter was 5.31 as against 4.79 for the chevron configuration.

Tests were made under the following conditions. Water to be treated was prepared as follows: To well water at 14° C. was added 50 ppm alumina sulfate, and then soda ash was added to the mixture to obtain pH 7. After pH adjustment, the mixture was added with kaolin so that the turbidity of the water before being introduced into the tube settlers is JIS 100°. Tube settlers of various passage configurations for testing were arranged at an angle of 60° to the horizontal. At the effluent end, the water collecting section of each settler was connected to a syphone, and measurement was made while controlling the flow rate of water passing through the tube passages by changing the height of tube end of the syphone. Test water was passed through groups of inclined tube passages. Operation at each flow rate was maintained for 30 minutes, and after that, samples of effluent from various tube passages were taken and subjected to turbidity measurement. In FIG. 5, the reference characters shown with respect to various lines correspond to the test numbers in Table 1. According to the test results, the performance of square configuration (C) was most unfavorable, and circular (A), hexagonal (B), and rhombus (D) were slightly better than square (A). Triangular was comparable to said (A), (B) and (D). The chevron cross-sectional configuration (E) and the approximate boomerang cross-sectional configuration (F) of this invention showed far much better results. The approximate boomerang configuration employed in the test was of somewhat larger hydraulic diameter than the chevron configuration tested. This was regarded as a condition unfavorable to the boomerang configuration tested. Nevertheless, the boomerang configuration exhibited somewhat better settling performance than the chevron configuration as is clear from the comparison of performance curve F with curve E. This reflects the effect of a stagnant flow zone developed by a boundary layer in the acute angle area in the chevron tube passage. On the other hand, the approximate boomerang cross-sectional configuration according to this invention eliminates such trouble and permits operation at a high average flow rate. If the both configurations are tested under same conditions, i.e. same cross-sectional area and same hydraulic diameter, the approximate boomerang configuration of this invention will show more favorable settling performance.

The tubular passage assembly 9 of above said configuration according to this invention may be constructed in various ways, but it can be reasonably and economically constructed in manner as described below.

Figure 6:
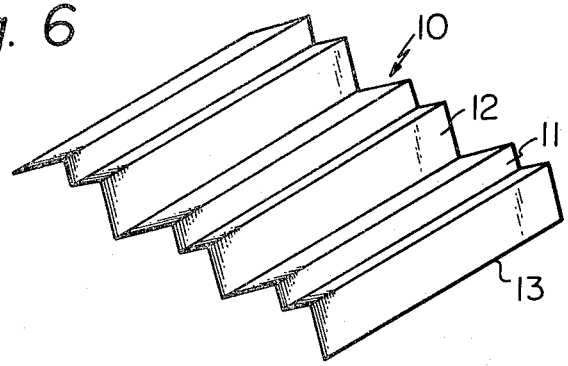
FIG. 6 is a bird's eye view of a corrugated sheet of which the tubular passage assembly of this invention is made.
Figure 7:
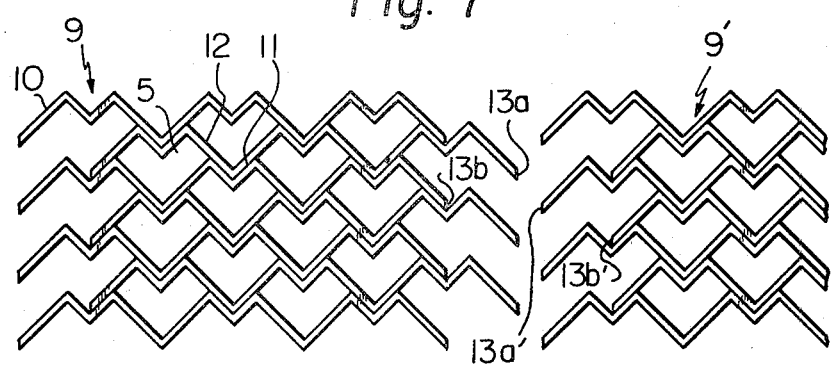
FIG. 7 is an end view of the flow passage ends of two tubular passage assemblies to be jointed together in crosswise direction, with the opposed side ends thereof shown side by side.

FIG. 6 shows a corrugated sheet 10 of synthetic resin or metal make which is a component material for said tubular passage assembly 9. Because of its simple shape, the corrugated sheet 10 may not necessarily be of costly vinyl chloride or the like which is of low buckling strength, and can be produced by shaping ordinary rigid PVC which is of low cost and has greater strength. The corrugated sheet 10 consists of a series of alternating small corrugations 11 and large corrugations 12, the former making top walls of the cross-sectional configuration and the latter making bottom walls. Corrugated sheets 10 are superposed one over another so that on each small corrugation 11 of a lower sheet is seated the backside of a large corrugation 12 of an upper sheet as shown in FIG. 7. Between two sheets superposed, one over the other, are formed tubular passages 5 of approximate boomerang cross-sectional configuration of this invention, each between one surface of contact and another. A tube nest, that is, tubular passage assembly 9 of desired size can be obtained by so superposing adequate number of corrugated sheets 10 and jointing them together. To have the tubular passages 5 disposed at an angle a to the horizon, it is desirable to superpose each sheet with a shift of a certain distance in lengthwise direction of the corrugations in relation to the nearest lower sheet. The resulting assembly 9 is of a rhomboid configuration as shown in FIG. 3, and all tubular passages thereof can be of equal length. Jointing and fixing of corrugated sheets can be done by using adhesive or adhesive tape, if the sheets are of synthetic resin. Metal corrugated sheets can be easily jointed or fixed by welding or soldering or by any suitable mechanical fixing means. Thus, the resulting assembly, as an integral stereo-structure, has high strength and rigidity.

Figure 8:
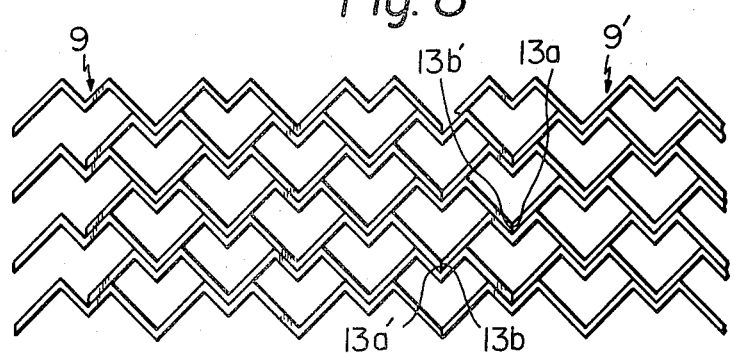
FIG. 8 is an end view of the flow passage ends of the two tubular passage assemblies of FIG. 7 connected together in lateral direction.

It is clear that said assembly 9 of corrugated construction can be easily assembled to the desired vertical size by superposing corrugated sheets according to the designed treating capacity for a tube settler. Crosswise connection of corrugated sheets can be easily made as well in the following way. FIG. 7 shows two tubular passage assemblies 9 and 9', with side ends thereof placed side by side. The corrugated sheets 10 composing the assemblies are designed so that each side end 13 of each sheet agrees with the bottom end of each large corrugation 12. (See FIGS. 4 and 6) Said bottom end is the very point that in the approximate boomerang configuration each two bottom sides meet or butt end-toend. When corrugated sheets are superposed one over another, a side end 13a of a first alternate sheet forms a side end of the resulting assembly, and a side end 13b of a second alternate corrugated sheet forms the bottom point of a small corrugation 11 (nearest to the assembly end) of a first corrugated sheet. The opposed side ends of the two assemblies 9 are alternately brought into contact so that as shown in FIG. 8, the side end 13a of a sheet layer of the first assembly 9 is butt jointed with the side end 13b' of a sheet layer of the second assembly 9' and concurrently the side end 13b of another sheet layer of the first assembly 9 is butt jointed with the side end 13a' of another sheet layer of the second assembly. In this way, sheet layers of two assemblies are connected by partial superposition, and if necessary, are bonded or jointed end-to-end. Crosswise connection of tubular passages is thus effected in orderly manner.

In the above described embodiment, a side end 13 of a corrugated sheet 10 agrees with a bottom point of a large corrugation 12. The ending point of a side end may be the bottom point of a small corrugation 11 as well or even a point adjacent to the bottom point of a corrugation and within the area of surface contact between an upper sheet and a lower sheet. The end-to-end superposition described above shifts the side ends of said two pairs of sheets crosswise by the sum of half a pitch of large corrugation 12 and half a pitch of small corrugation 11. Thus, it is necessary to connect the two assemblies 9 and 9' so that such a shift can be compensated between the opposed ends of the assemblies and so that the sheets butt jointed of the two sheets are enabled to have an adequate area of surface contact adjacent thereto for suitable adhesion.

Figure 9:
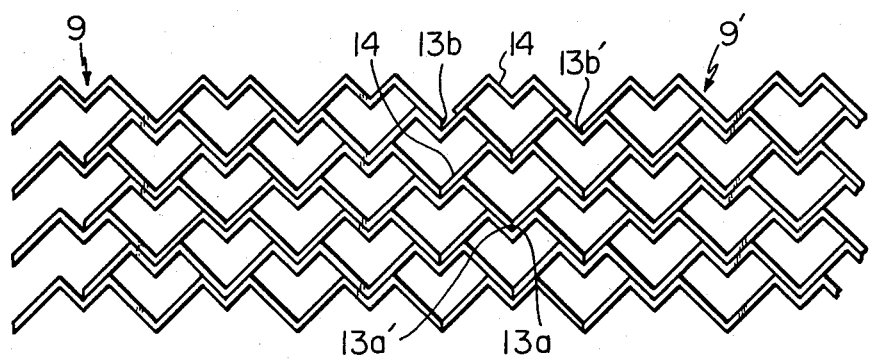
FIG. 9 is an end view of the flow passage ends of the two tubular passage assemblies of FIG. 7 connected together laterally in the manner different from FIG. 8.
Figure 10:
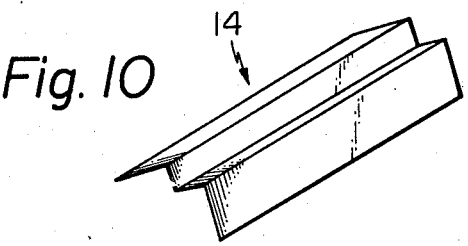
FIG. 10 is a bird's eye view of a corrugated strip used in the connection with two assemblies in FIG. 9.

FIGS. 9 and 10 show another example of side-to-side connection of two tubular passage assemblies 9 and 9'. A side end 13a of a first sheet of a first assembly 9 is butt jointed to a side end 13a' of a first sheet of a second assembly 9'. In this case, between second sheet ends 13b and 13b' of the two assemblies are present a distance corresponding to one pitch of large corrugation 12 plus one pitch of small corrugation 11. In order to compensate for said distance, a corrugated strip 14 corresponding to one pitch of large corrugation plus one pitch of small corrugation as shown in FIG. 10 is prepared and connected to side ends 13b and 13b'. If necessary, the corrugated strip is bonded to the assemblies 9, 9' and corrugated sheet 10 on the surface of contact thereto, so as to complete crosswise connection. This connection and bonding can be done, without appreciable difficulty, by precoating the surface of contact with adhesive, if so required, and inserting a corrugated strip 14 from the influent end of the tubular passages.

Figure 11:
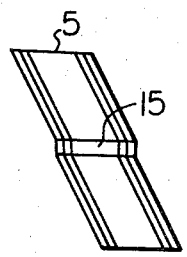
FIG. 11 is a vertical section of an inclined tubular passage including a vertical portion.

This invention can be practised with the following improvements. For example, with respect to all tubular passages disposed at an angle b to the horizon, a short-distance vertical section 15 may be provided as shown in FIG. 11. According to this modification, in the vertical section the collapse of precipitates and deposits on the inclined bottom surface in a tubular passage 5 is induced. This phenomenon can be utilized in furthering the slip-off of the precipitates on the bottom. In order to effect such crosswise connection as shown in FIGS. 9 and 10 with respect to this modified embodiment, if it is of metal or other rigid material, it is necessary to insert a corrugated strip 14 of about ½ length into the passage from the both ends thereof. The presence of such vertical section 15 contributes to the increase of strength and rigidity of the corrugated sheet assembly 9.

Figure 12:
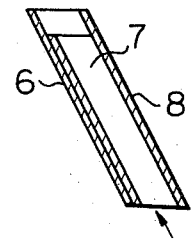
FIG. 12 is a vertical sectional side elevation of a tubular passage showing a modified effluent end of the passage.

Further, it is possible that at the effluent end of the inclined tube passage assembly 9, an inclined side 7 has no upper end portion and that as shown in FIG. 12, the top edge of the inclined side 7 is lower than the top edges of the bottom side surface 6 and top side surface 8. With this type of tube settler, it may happen after a long period of use that suspended material sticks to the effluent end of its tubular passage, whereby the effluent end is clogged. Said modified embodiment helps alleviate such clogging tendency.

According to this invention, the cross section of the tubular passages constituting the tube settler gives a uniform height throughout all sections in crosswise direction, except small side-end portions. This insures that the distance which suspended particles in the fluid being treated must fall until they reach the bottom of the cross section does not exceed a certain value throughout the most part of the cross section in crosswise direction. Accordingly, the precipitation of suspended particles is substantially uniform throughout the entire area over the bottom. This allows effective utilization of settling area inside the tube passage. Moreover, the bottom side is of V shape and precipitates on the bottom gather in center portion thereof to form thick condensed precipitate layers. This facilitates the slip-off of precipitates on the inclined plane and decreases the possibility of precipitates being resuspended in fluids owing to the backflow of fluids, thus resulting in satisfactory separation operation.

The cross section of the tubular passage of this invention has a substantially lower hydraulic radius than those of commonly used tube passages. Its hydraulic radius is very close to that of the chevron cross-sectional configuration. This results in a low Reynolds number (a number expressed as a function of flow rate to geometric dimensions, and accordingly a high critical flow rate as substantially determined from the critical Reynolds number which avoids turbulent flow, a factor preventing settling of suspended particles (whose rate of settling is low) and which maintains laminar flow. This means increased treating capacity and more compact apparatus).

No acute-angle zone is present in the cross-sectional configuration of the tubular passage of this invention. Accordingly, there is no risk of a stagnant flow zone developing due to a boundary layer. This results in increased average flow rate and virtual gain in treating capacity.

As above described, according to this invention, it is possible to obtain various practical improvements, such as reduced time requirement for separation, increased clarity of separated fluids, increased treating capacity, and provision of more compact apparatus. In addition, the following benefits can be obtained. For example, in cases where fluids to be treated contain light suspended particles in addition to materials having heavier specific gravity than water, or where oil emulsion are to be broken and separated, the surface consisting of the top sides and inclined sides of the passage cross section serve as effective separation surface in connection with the floating and separation of such material. The tubular passage assemblies of this invention can be easily fabricated and can be easily bonded and connected either vertically or crosswise. Assembling and bonding at locations of equipment can be performed at ease. Transportation in the form of corrugated sheet is possible and this results in low transport cost. The corrugated sheet can be easily made from thin synthetic resin sheet or the like, and therefore resulting tubular passage assemblies are light in weight. The assembly of the invention is of integral stereo-structure and accordingly it has high strength and rigidity.

I claim:

1. A method of fabricating a tubular passage assembly, which comprises the steps of
    (a) forming a plurality of corrugated sheets, each having a series of alternating large and small corrugations,
    (b) superposing said corrugated sheets one over another so as to dispose each backside of large corrugations of an upper sheet in contact with a corresponding small corrugation of a lower sheet,
    (c) jointing each contacting portion of said backside of large corrugations of the upper sheet and said small corrugations of the lower sheet by adhesive fixing means to fabricate the tubular passage assembly, and jointing a plurality of said tubular passage assemblies in crosswise direction by
    (d) disposing the side end of a second alternate corrugated sheet layer in a superposed assembly more inwardly with respect to the axis of the assembly than the side end of a first alternate sheet layer by the sum of half a pitch of large corrugation and half a pitch of small corrugation,
    (e) bringing the side ends of a first assembly into alternate contact with the side ends of a second assembly so as to butt-joint one end of a first sheet layer of said first assembly with the end of a second sheet layer of said second assembly, and likewise to butt-joint the end of a second sheet layer of said first assembly with the end of the first sheet layer of said second assembly, and
    (f) jointing each contacting portion of the first assembly and the second assembly by adhesive fixing means for jointing the tubular passage assemblies in crosswise direction.

2. A method of fabricating a tubular passage assembly, which comprises the steps of
    (a) forming a plurality of corrugated sheets, each having a series of alternating large and small corrugations,
    (b) superposing said corrugated sheets one over another so as to dispose each backside of large corrugations of an upper sheet in contact with a corresponding small corrugation of a lower sheet,
    (c) jointing each contacting portion of said backside of large corrugations of the upper sheet and said small corrugations of the lower sheet by adhesive fixing means to fabricate the tubular passage assembly, and jointing a plurality of said tubular passage assemblies in crosswise direction by
    (d) disposing the side end of a second alternate corrugated sheet layer in a superposed assembly more inwardly with respect to the axis of the assembly than the side end of a first alternate sheet layer by the sum of half a pitch of large corrugation and half a pitch of small corrugation,
    (e) bringing the side ends of the first assembly into contact with the side ends of the second assembly so as to butt-joint the end of a first sheet layer of said first assembly with the end of said first sheet layer of said second assembly,
    (f) fitting a one-pitch corrugated strip of large and small corrugations between the side ends of the second sheets of said assemblies, and
    (g) jointing each contacting portion of the said corrugated strip and both assemblies by adhesive fixing means for jointing the tubular passage assemblies in crosswise direction.

* * * * *